W. GLUE.

Refuse-Burner.

No. 6,479. Reissued June 8, 1875.

Attest:
Joseph L. Wildman
French S. Evans.

Inventor:
William Glue
By N. Cranford
atty

UNITED STATES PATENT OFFICE.

WILLIAM GLUE, OF MUSKEGON, MICHIGAN.

IMPROVEMENT IN REFUSE-BURNERS.

Specification forming part of Letters Patent No. 145,861, dated December 23, 1873; reissue No. 6,479, dated June 8, 1875; application filed May 19, 1875.

*To all whom it may concern:*

Be it known that I, WILLIAM GLUE, of Muskegon, in the county of Muskegon, in the State of Michigan, have invented certain Improvements in Furnaces for Burning the Refuse of Saw-Mills, which improvement is fully set forth in the following specification, reference being had to the accompanying drawings.

The object of this invention is to produce a cheap and safe and reliable means for consuming waste material, such as sawdust, lath-edgings, and other refuse matter that accumulates about a saw-mill, and, if not removed or destroyed, becomes a source of danger to the mill itself, as when such matter becomes dry it is easily set on fire by sparks from the engine or other incidental causes. This furnace can also be used to burn the waste of any other manufacturing business, such as accumulates about tanneries, sugar-mills, turning-lathes, and planing-machines; and it consists in the construction of the furnace, the arrangement of devices for feeding the material to be consumed into the furnace, and the devices for regulating the draft for the complete destruction of the waste, and perfect safety of the furnace itself while so destroying or burning its contents.

Figure 2:
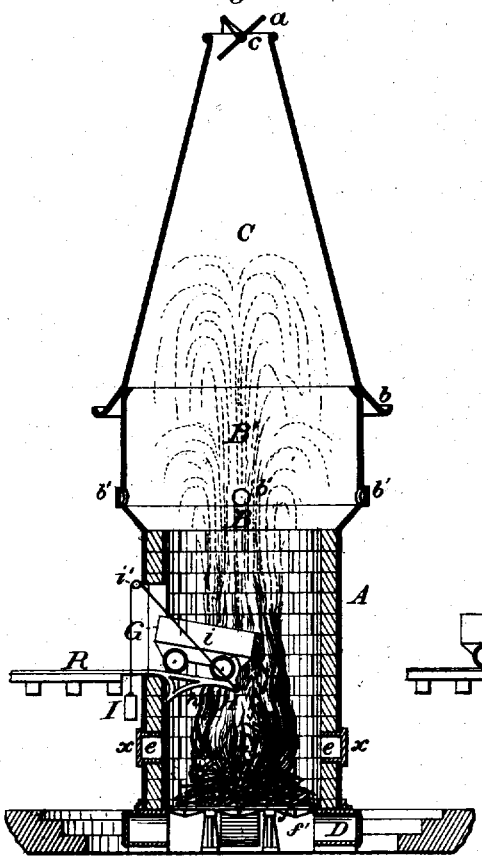
Figure 1:
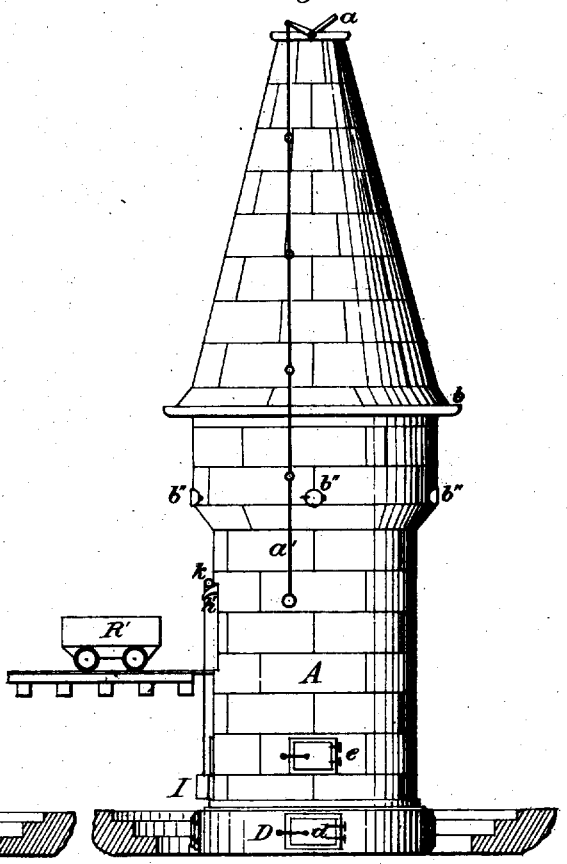
Figure 3:
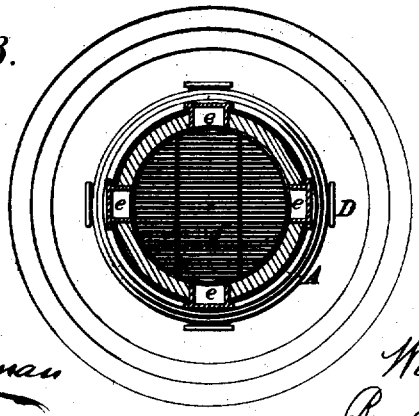

In the drawings, Figure 1 is a perspective of the side of the furnace complete; Fig. 2, a vertical section of same, and Fig. 3 a horizontal section above the level of the gate.

A is the outer shell of the combustion-chamber, constructed of metal plates, secured together by rivets, as usual in steam-boilers or smoke-stacks, the thickness of the metal plates being proportioned to the size of the furnace and its capacity for the consumption of the waste material. It is built perpendicular, in the form of a cylinder, and of uniform diameter throughout the height of the lower section, and is lined with fire-brick or other material capable of withstanding a high degree of heat. B is a section of the outer shell above the perpendicular part, and is funnel-shaped, or enlarged in its diameter on the top, to give a greater space for the heated gases above the point of complete combustion. B′ is an upright section above section B, and is of equal diameter from its base to its top, and has a series of openings, *b′ b′*, near its base, or where it is connected with the top of section B. These openings have doors *b″ b″* to regulate the openings *b′*, or to close them altogether, if necessary. C is the upper section or stack of the furnace, conical in form, of the same diameter at its base as section B′, and decreases in diameter as it rises toward the top to one-half, more or less, of the diameter of its base, and forming at the top opening *c*. The top is provided with a circular flap-valve, *a*, secured to a crank-shaft having its bearings in opposite sides of the stack or cylinder, so as to easily turn thereon. *a′* is a rod or chain attached to the crank of the valve-shaft, and extending down to within easy reach of the attendant, who, by it, can open the valve, close it, or regulate it to any point, as may be desired. *b* is a projecting gutter encircling the base of the conical section C, and prevents water from dripping or coming in contact with the sections below it that are intensely heated, whereby disfiguration or injury to the metal plates of the shell is avoided. D is the base-section, upon which the whole furnace rests, is preferably formed of cast-iron, and incloses the ash-pit, but can be of other proper material, and is provided with the necessary openings for removing the ashes from the pit, which openings are inclosed or covered by the doors *d*. *f* is the grate of the furnace, constructed of longitudinal perforated bars, in three sections, supported by an inwardly-projecting ledge of the base D and two bearers, *f′ f′*, as seen in Fig. 2. *e e e e* are openings through section A at a little distance above the grate, for the admission of air to assist in the combustion of the waste. These openings *e* are provided with doors or dampers, to regulate the amount of air to be admitted into the furnace. G is a large opening in the side of section A, at a proper height above the grate *f*, through which opening the waste or refuse matter to be burned is discharged into the furnace. H is the door that closes opening G, is hinged at its lower edge to the outer shell A, and opens inwardly, and is provided on its inner side with projecting braces *h*, which, when the door is forced fully open, strike and rest against the inner lining of the furnace, and giving to the door an inwardly-inclined position, as seen in Fig. 2; or these braces may be dispensed with, and the same result produced by affixing stops on the suspending-chains to the door. Upon the outside of the door, when closed, are secured two rails, that form the way upon which the wheels of the refuse-trucks travel, and the upper ends of these rails curve outward in a semicircle, *h'*, of about the same diameter as the wheels of the trucks. R is a railway-track coming from the refuse pile, and on which the trucks travel in delivering the refuse into the furnace, and as the truck R' strikes the outside of door H, its momentum forces the door inward, and allowing the truck to travel upon the rails on the outside of the door until the door sustains the weight of the truck and its load, and the braces *h* strike or rest on the inner lining of the furnace, and the truck-wheels are forcibly stopped by the semicircles *h'*; the momentum of the truck being such, when suddenly arrested in its advance movement, that (the front end of the truck being hinged at its top edge and secured at its bottom by a catch, which, at this moment, is released) the contents of the truck are precipitated into the furnace, as seen in Fig. 2. The truck or car is now withdrawn, and the door closes automatically by means of a balance-weight, I, wire-ropes or chains *i*, and pulleys *i'*, as seen in Fig. 2. The openings or series of openings *b'* in section B' are for the purpose of admitting cold air into the furnace above the point of combustion, which has the effect to keep the shell of section B' and C of the furnace cool, or to prevent it from becoming so intensly hot as it would if the cold air was not admitted at this point, and taken up by the hot gases in contact with the shell and out at opening *c*, thus creating a great saving in the expense of constructing furnaces for this purpose over that form in which two metal-plate shells, with a water-space between them, are employed, as is commonly the construction in use to keep the outside cool, or so that it will not ignite all combustible substances that may happen to come in contact with or near it.

Having thus described my invention, what I claim as new, and desire to secure by Letters Patent, is—

1. The door H, hinged at its bottom edge, and provided with rails, upon which a truck or car travels, having their upper ends curved to stop the car, as and for the purpose described.

2. The cold-air openings *b' b'*, located in section B', and above the combustion-chamber of a refuse-burning furnace, substantially as and for the purposes described.

3. The combination of railway R and truck or car R' with a furnace having opening G and door H, constructed to close automatically, substantially as and for the purpose described.

4. A furnace for burning refuse matter, composed of sections A, B, B', and C, constructed to be supplied in refuse, and the combustion thereof regulated, in the manner and by the means substantially as described.

WM. GLUE.

Witnesses:
E. S. LATIMER,
FERDINAND WATTENBERG.